United States Patent [19]

Kurosu

[11] Patent Number: 5,555,227

[45] Date of Patent: Sep. 10, 1996

[54] DISC RECORDING AND/OR REPRODUCING APPARATUS

[75] Inventor: Tadao Kurosu, Saitama, Japan

[73] Assignee: Sony Corporation, Tokyo, Japan

[21] Appl. No.: 223,674

[22] Filed: Apr. 6, 1994

[30] Foreign Application Priority Data

Apr. 28, 1993 [JP] Japan ................................ 5-123080

[51] Int. Cl.⁶ ........................... G11B 17/26; G11B 17/04
[52] U.S. Cl. ........................................ 369/37; 369/77.1
[58] Field of Search ............................. 369/36, 37, 77.1, 369/77.2, 178, 191, 192, 194, 263

[56] References Cited

U.S. PATENT DOCUMENTS

| | | | |
|---|---|---|---|
| 4,755,978 | 7/1988 | Takizawa et al. | 369/37 |
| 5,115,419 | 5/1992 | Akiyama et al. | 369/37 |
| 5,123,005 | 6/1992 | Kurosu | 369/77.1 |
| 5,172,362 | 12/1992 | Hattori et al. | 369/77.2 |
| 5,193,079 | 3/1993 | Ko et al. | 369/37 |
| 5,204,850 | 4/1993 | Obata | 369/263 |
| 5,386,403 | 1/1995 | Morioka et al. | 369/37 |

FOREIGN PATENT DOCUMENTS

3292668 12/1991 Japan ................................ 369/37

*Primary Examiner*—Robert S. Tupper
*Assistant Examiner*—William R. Korzuch
*Attorney, Agent, or Firm*—Ronald P. Kananen

[57] ABSTRACT

A disc recording/reproducing apparatus includes a recording/reproducing section, a disc tray, a driving mechanism, a rotary table, a lock mechanism for the disc tray and an oscillation suppression mechanism. The recording/reproducing mechanism is provided in a main body of the apparatus for recording/reproducing information signals on or from the disc. The disc tray may be moved between a position facing the recording/reproducing section in the main body of the apparatus and an unloading position outside of the main body of the apparatus. The driving mechanism causes the disc tray to be moved between the loading position and the unloading position. The rotary table is rotatably mounted on the disc tray and has plural disc-setting sections extending radially from the center of rotation. The rotary table may be rotated relative to the disc tray for selectively locating one of the plural disc setting sections at a position facing the recording/reproducing section. The lock mechanism engages the rotary table to prevent rotation thereof when the disc tray is not located at the loading position or at the unloading position. The oscillation suppression mechanism inhibits oscillatory movements of the disc tray at its loading or unloading positions.

8 Claims, 11 Drawing Sheets

DISC RECORDING AND/OR REPRODUCING APPARATUS

BACKGROUND

1. Field of the Invention

The invention relates to a disc recording and/or reproducing apparatus. More particularly, the present invention relates to a transport mechanism for a disc recording and/or reproducing apparatus.

2. Background of the Invention

There has hitherto been proposed a disc recording and/or reproducing apparatus in which information signals are recorded on and/or reproduced from a recording disc, as a recording medium, such as an optical disc or a magneto-optical disc.

The disc recording and/or reproducing apparatus includes a rotation mechanism for holding and rotating the recording disc and a pickup unit for writing/reading the information signals on or from the recording disc as it is rotated by the rotation mechanism.

The disc recording and/or reproducing apparatus also includes a disc tray adapted to transport a recording disc set thereon between the outer side and the inner side of a main body of the apparatus. The disc tray is supported on a supporting shaft arranged on a chassis of the recording and/or reproducing apparatus. The disc tray is movable along the supporting shaft between an unloading position, protruding from the main body of the apparatus and a loading position substantially facing a disc driving unit within the main body of the apparatus on the chassis. The disc tray is movable by a driving mechanism, such as an electric motor. The disc tray on which the recording disc is set and which has been moved to the loading position has reached the position in which the recording disc is in register with the disc driving unit. The recording disc positioned in register with the disc driving unit is loaded on the driving unit. Thus the recording disc is held by the rotation mechanism and thereby run in rotation for recording/reproducing the information signals by an optical pickup unit.

Among the disc recording and/or reproducing apparatus having a rotary table, there is such an apparatus in which a selected one of plural recording discs may be retrieved for recording/reproduction by the disc driving unit. In this type of the disc recording and/or reproducing apparatus, an apparatus is proposed in which a disc tray carries a rotary table on which plural recording discs are set in parallel, as disclosed for example in U.S. Pat. Nos. 4,755,978 and 5,123,005. The rotary table is substantially disc-shaped and rotatable supported relative to the disc tray. The upper surface of the rotary table is formed with plural disc-setting recesses arrayed on the circumference of a circle having the center of rotation of the rotary table as its center. These disc-setting trays are arrayed at an equiangular distance about the center of rotation of the rotary table. The rotary table is rotated relative to the disc tray by a driving mechanism, such as an electric motor, mounted on the disc tray.

When the disc tray is at the loading position, the rotary table is rotated relative to the disc tray for selectively moving one of the recording discs set thereon to a position in register with the disc drive unit.

Among the disc recording and/or reproducing apparatus having a rotary table, there is an apparatus in which, when a recording disc is set on the disc drive unit, the disc tray may be moved to an unloading position. With this type of the disc recording and/or reproducing apparatus, when a recording disc set in one of the disc setting recesses has been loaded on the disc drive unit, the disc tray is moved to the unloading position for setting other recording discs on other disc setting recesses or exchanging the discs set in such other disc setting recesses. Therefore, with such disc recording and/or reproducing apparatus, the information signals may be continuously recorded on and/or reproduced from a number of the recording discs larger than the number of the disc setting recesses formed on the rotary table. If, with the disc recording and/or reproducing apparatus in which the disc tray is designed to be moved to the unloading position during loading of the recording disc on the disc drive unit, the disc tray is moved to the unloading position when a recording disc has been set on the disc drive unit, the disc tray is drive-controlled so that it may again be moved to the loading position on the proviso that the rotational angular position of the rotary table when the disc tray was at the loading position is maintained and that there is no other recording disc set on the disc setting recess on which the recording disc loaded on the disc drive unit was set.

With the above-described disc recording and/or reproducing apparatus, having the disc tray, there is a risk that, if the recording disc is rotated during the time the disc tray is at the loading position, the disc tray may oscillate with respect to the chassis in resonance with the oscillations caused with the rotation of the recording disc. Such resonant oscillations tend to produce abnormal sounds or obstruct the normal recording/reproducing operation of the pickup unit.

Among the conventional disc recording and/or reproducing apparatus, there is such an apparatus which is provided with a holding mechanism for holding the disc tray in association with the operation of holding the recording disc by the disc drive unit for suppressing any oscillation of the disc tray. Such a holding mechanism complicates the structure and renders it difficult to simplify the construction and to reduce the size of the disc recording and/or reproducing apparatus in its entirety.

Also, with the disc recording and/or reproducing apparatus which is provided with the rotary table and in which the disc tray may be moved to the unloading position when a recording disc is loaded on the disc drive unit, the disc tray which is set to the unloading position during the rotation of the recording disc tends to oscillate in resonance with oscillations caused by the recording disc rotation.

Among the disc recording and/or reproducing apparatus, there is an apparatus in which a pre-loading force tending to bias the disc tray against a supporting shaft is applied to the disc tray for suppressing resonant oscillations of the disc tray. Such pre-loading force tends to increase the load against the movement of the disc tray along the supporting shaft and the sliding noise between the disc tray and the supporting shaft and to enlarge the size of the drive mechanism.

On the other hand, with the disc recording and/or reproducing apparatus which is provided with a rotary table and in which the disc tray may be moved to the unloading position when a recording disc is set on the disc drive unit, the rotary table tends to rotate under an external pressure.

Above all, since the control for the driving mechanism is not in operation during power off, the rotary table may be rotated under the external pressure. If the recording disc is set on the rotary table, it is possible for the disc tray to rotate back to the loading position under the external pressure even in cases where a recording disc is loaded on the disc drive unit and another recording disc is set in the disc setting recess positioned in register with the disc drive unit. In such case, there is a risk that the recording disc loaded on the disc drive unit and the other disc set on the rotary table will collide against each other and cause damage or destruction of the discs.

SUMMARY OF THE INVENTION

It is therefore an object of the present invention to provide a disc recording and/or reproducing apparatus which resolves the above-mentioned problems.

According to the present invention, there is provided a disc recording and/or reproducing apparatus including a recording/reproducing section, a transporting tray, a drive mechanism, a rotary table, a first lock mechanism, and a second lock mechanism. The recording/reproducing section is provided in a main body of the apparatus for recording/ reproducing information signals on or from the disc. The transporting tray is movable between a loading position facing the recording/reproducing section in the main body and an unloading position outside of the main body. The driving mechanism causes the transporting tray to be moved between the loading position and the unloading position. The rotary table, rotatably mounted on the transporting tray, has plural disc-setting sections extending radially from its center of rotation. The rotary table is rotated with respect to the transporting tray for causing a selected one of the disc-setting sections to be moved to a position facing the recording/reproducing section. A first lock mechanism is provided on the transporting tray so as to be engaged with the rotary table to obstruct the rotation of the rotary table relative to the transporting tray. The first lock mechanism obstructs the rotation of the rotary table when the transporting tray is not located at the loading position or at the unloading position. A second lock mechanism is actuated by the driving mechanism in order to obstruct movement of the transporting tray. When the transporting tray reaches the unloading position, the second lock mechanism is actuated by the driving mechanism in order to obstruct the movement of the transporting tray.

According to the present invention, there is provided a disc recording and/or reproducing apparatus including a recording/reproducing section, a transporting tray, a driving mechanism and a suppression mechanism. The recording/ reproducing section is provided in the main body of the apparatus for recording/reproducing information signals on or from the disc. The transporting tray is movable between the loading position facing the recording/reproducing section in the main body and the unloading position outside of the main body. The driving mechanism causes the transporting tray to be moved between the loading position and the unloading position. The suppression mechanism inhibits oscillatory movements of the transporting tray at the leading position or at the unloading position.

The present invention thus provides a disc recording and/or reproducing apparatus whereby resonant oscillations of the transporting tray at the loading position or at the unloading position may be inhibited without complicating the structure and rotation of the rotary table may be inhibited during movement of the transporting tray.

According to the present invention, since movement of the transporting tray is suppressed by the second lock mechanism driven by the drive mechanism at the loading position or at the unloading position, the tray will not move inadvertently into the inside of the main body when the tray is at the unloading position. Also, since rotation of the rotary table is suppressed during loading of the transporting tray by the first lock mechanism, it will not rotate during loading or inadvertently rotate during power down of the apparatus.

According to the present invention, since any oscillatory movements of the transporting tray are suppressed by the suppression mechanism at the loading position and at the unloading position, the transporting tray will not oscillate in resonance with rotation of the disc caused by the recording/ reproducing apparatus. Furthermore, according to the present invention, the transporting tray may be moved without loading the drive mechanism for the transporting tray by suppressing the resonation of the transporting tray.

DESCRIPTION OF THE INVENTION

Referring to the drawings, preferred embodiments of the present invention will now be explained in detail.

Figure 1:
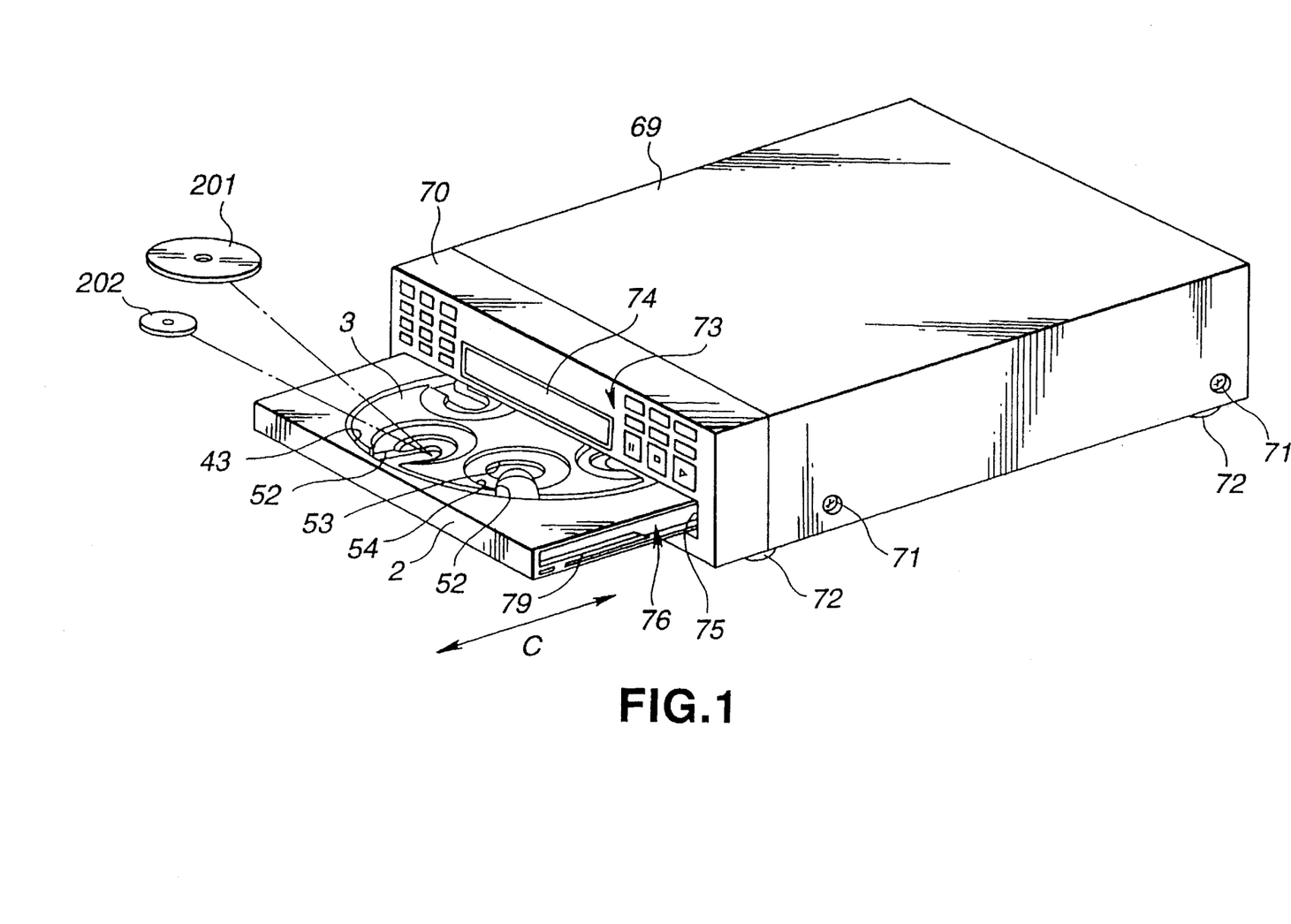
FIG. 1 is a perspective view showing a disc recording and/or reproducing apparatus in a loading state according to the present invention.

The disc recording and/or reproducing apparatus is designed to reproduce information signals from a number of recording discs, that is plural large-sized discs 201 and/or plural small-sized discs 202, loaded therein, as shown in FIG. 1. These discs 201, 202 are each comprised of a disc substrate formed of a transparent material, such as polycarbonate, and a reflective layer deposited on the disc substrate. On the disc substrate patterns of small-sized protrusions and recesses corresponding to the information signals are formed by injection molding or the like technique. The large-sized disc 201 and the small-sized discs 202 are of diameters of, for example, 12 cm and 8 cm, respectively. The large-sized discs 201 and the small-sized discs 202 are each formed with a chucking center hole having a diameter of, for example, 15 mm. The diameter of the chucking hole and the thickness of the disc substrate are the same for the large-sized disc 201 and the small-sized disc 202.

Figure 2:
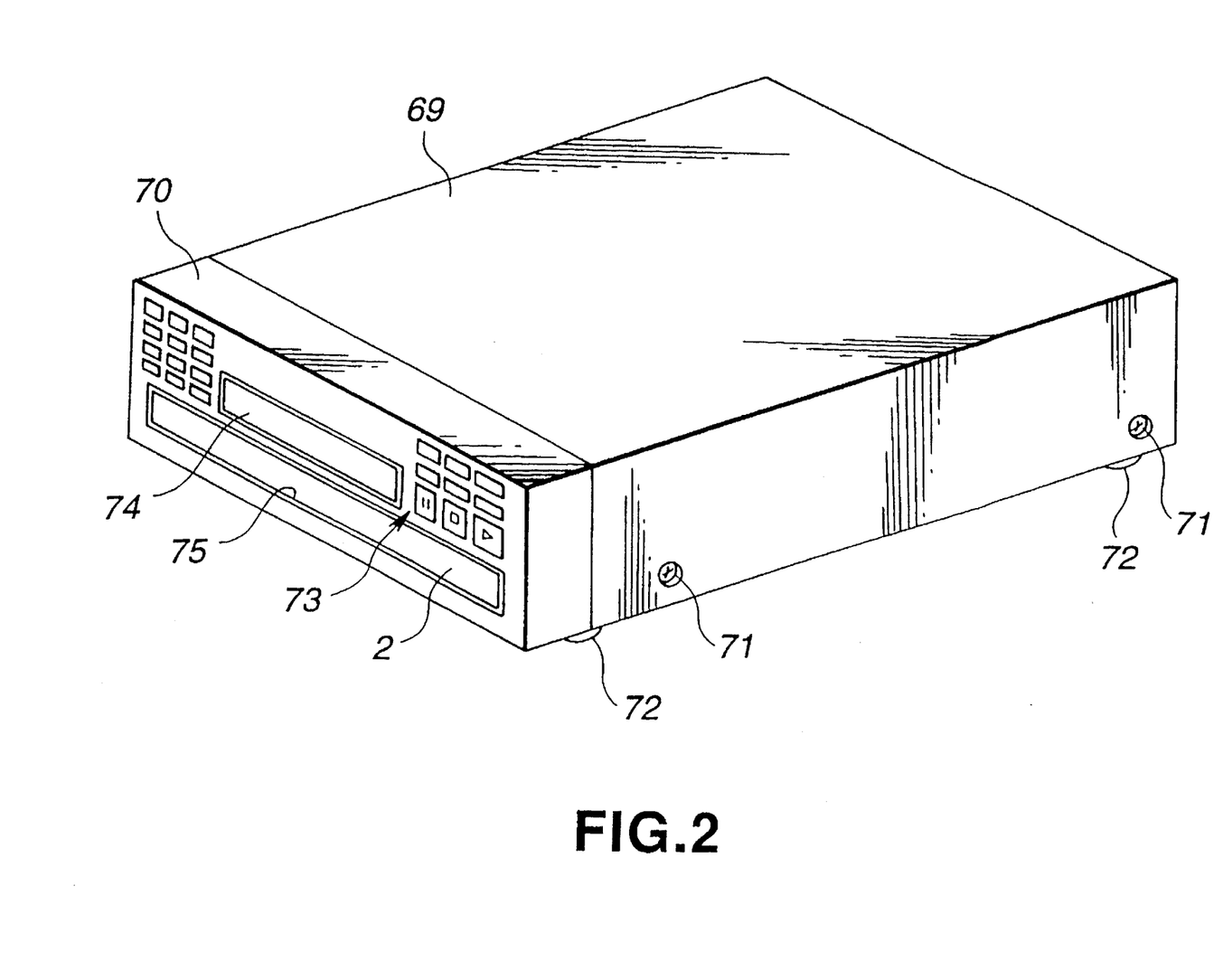
FIG. 2 is a perspective view showing the disc recording and/or reproducing apparatus of FIG. 1 in a unloading state.
Figure 3:
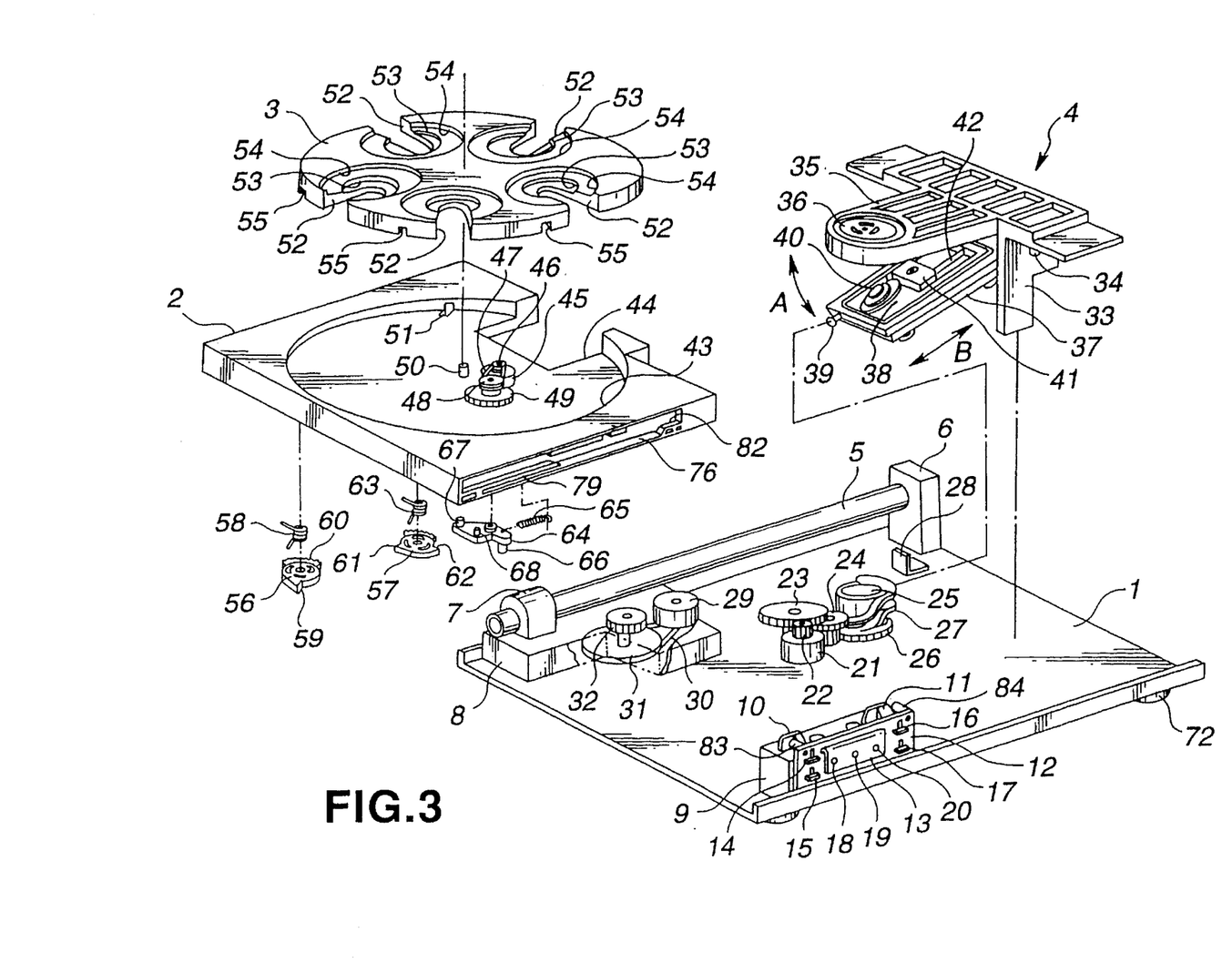
FIG. 3 is an exploded perspective view showing essential portions of the disc recording and/or reproducing apparatus shown in FIG. 1.

The disc recording and/or reproducing apparatus includes a chassis 1, as shown in FIGS. 2 and 3. The chassis 1 is a substantially flat plate the lower side of which carries four insulators 72. An outer casing is constituted by the chassis 1, an upper cover 69 and a front panel 70. That is, the upper cover 69 is secured to the chassis 1 by set screws 71, 71 for constituting both sidewalls, a rear wall and a top plate of the outer casing. The front panel 70 has an actuating section 73, a display 74 and a slit aperture 75 for entrance and exit of a disc tray 2 as later explained, and constitutes the front wall of the outer casing.

The disc recording and/or reproducing apparatus also includes a control circuit, not shown. The control circuit is constituted by a CPU and the like and is responsive to actuation of the actuating section 73 and the results of detection by the disc detection device as later explained to control the motors and the optical pickup unit as later explained.

On the chassis 1 is mounted a disc drive unit 4 for reading out information signals from the discs 201 and 202. The disc drive unit 4 includes a support 33 mounted on the upper surface of the chassis 1 and a movable frame 37 rotatably supported on the upper surface of the chassis 1 via a supporting shaft 34. The support 33 includes a pair of posts and a top plate bridging the upper ends of these posts and cast integrally with the posts. The movable frame 37 is mounted between the posts.

On the movable frame 37, a pickup block 38 for suppressing transmission of oscillations from the frame 37 is mounted via a buffer, not shown. The optical pickup block 38 includes a spindle motor and an optical pickup unit 41. A disc table 40 is mounted on a driving shaft of the spindle motor. The disc table 40 is substantially circular in shape and carries tapered protrusions engaged in chucking holes in the discs 201, 202. The optical pickup unit 41 is supported by a guide shaft 42 mounted on the pickup block 38 for movement in a direction towards and away from the disc table 40 indicated by arrow B in FIG. 3.

The top plate of the support 33 has an integrally formed arm section 35, the foremost part of which rotatable carries a chucking plate 36 disposed facing the disc table 40.

The disc drive section 4, when mounted on the chassis 1, has its movable frame 37 positioned below the arm section 35, that is towards the chassis 1. The movable frame 37 may be rotated in a direction in which the disc table 40 is moved towards and away from the chucking plate 36 as shown by arrow A in FIG. 3. The disc table 40 has a magnet, enclosed therein, for attracting the chucking plate 36, formed of iron, stainless steel or the like magnetic material, when the movable frame 37 is rotated towards the movable arm section 35.

The chassis 1 carries a chucking motor 21 adapted for rotating the movable frame 37. The chucking motor 21 rotates a cam tube 25 via speed-reducing gears 23, 24 rotatable mounted on the chassis 1 by a driving gear 22 mounted on a driving shaft. The cam tube 25 is substantially cylindrical-shaped and rotatably mounted on the chassis 1. The cam tube 25 has a gear part 26 meshing with the speed-reducing gear 24 and a cam groove part 27 which is formed substantially spirally on the outer peripheral surface of the cam tube 25. The cam groove part 27 is engaged by a profiling pin 39 protuberantly formed on the free end of the movable frame 37. When the chucking motor 21 is driven in operation, the cam tube 25 is rotated so that the movable frame 37 is rotated about a pivot 34 between a chucking position of connecting the disc table 40 to the chucking plate 36 and a release position in which the disc table 40 is disengaged from the chucking plate 36.

It is possible for the disc drive unit 4 to clamp the center part of the large-sized disc 201 or the small-sized disc 202 between the disc table 40 and the chucking plate 36 in order to hold the disc in position with the chucking hole as reference. It is also possible for the disc drive unit 4 to rotate the disc 201 or 202 by the spindle motor. The optical pickup unit 41 may be moved across the inner and outer rims of the discs 201 or 202, thus driven in rotation, in order to read or record the information signals from or on the discs 201 or 202.

The disc tray 2, as a transporting tray, is movably mounted on the chassis 1. The disc tray 2 is a substantially flat plate mounted parallel to the chassis 1. The disc tray 2 has its one lateral side supported by a supporting shaft 5 arranged on one lateral side of the chassis 1, while having its opposite lateral side supported by a supporting block 9 arranged at a forward portion on the opposite lateral side of the chassis 1. Thus the disc tray 2 is movable in the fore-and-aft direction, that is in a direction along the length of the supporting shaft 5. Supporting shaft 5 has its forward end supported by a supporting portion 7 of a block 8 arranged at a forward portion on one lateral side of the chassis 1. The supporting shaft also has its rear end supported by a shaft supporting member 6 arranged at a rear portion on one lateral side on the chassis 1. On the upper surface of the supporting block 9 are protuberantly formed a pair of support lugs 10, 11, the distal ends of which are caused to support a rail 77 mounted on the lower surface of the disc tray 2. (See FIG. 4). The rail 77 is secured to the disc tray 2 by a set screw 78.

Figure 9:
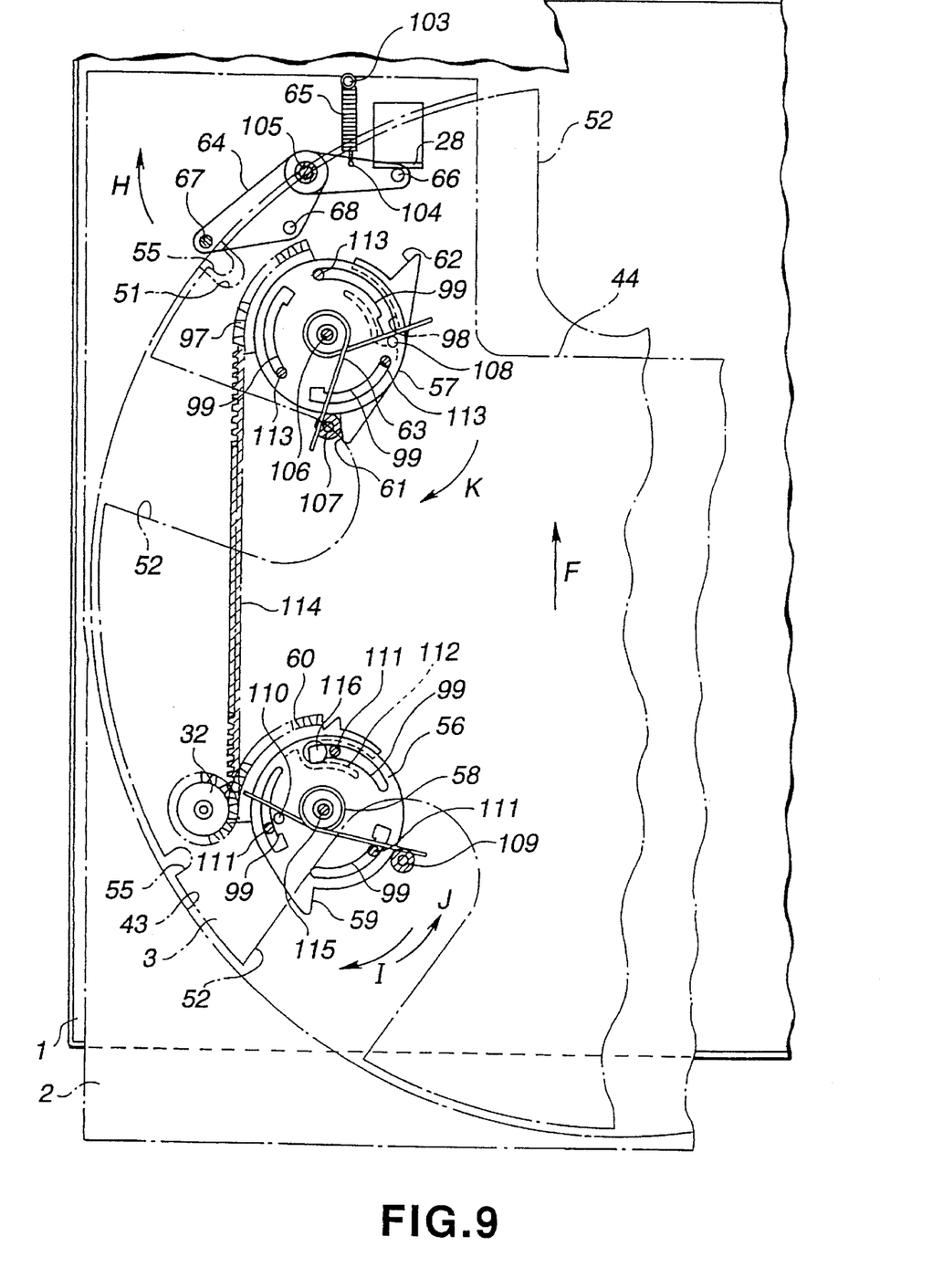
FIG. 9 is an enlarged plan view showing the state of a disc tray and related components of the disc recording and/or reproducing apparatus of FIG. 1 in the loading state.

On the chassis 1 is mounted a loading motor 29 as a driving means. The loading motor 29 rotationally drives a follower pulley 31 and a loading gear 32 operatively connected to the follower pulley 31 via an endless drive belt 30. The lower surface of the disc tray 2 carries a rack gear 114 which meshes with the loading gear 32, as shown in FIG. 9. The rack gear 114 is formed so as to extend in the fore-and-aft direction of the disc tray 2. That is, when the loading motor 29 rotates, the disc tray 2 is moved in the fore-and-aft direction as shown by arrow C in FIG. 1. The disc tray 2 is moved between the loading position shown in FIGS. 1 and 9 and the unloading position shown in FIGS. 1 and 11. The loading position is the position in which the disc tray 2 is positioned on the chassis 1, in other words, the disc drive unit 4 is faced by the discs 210, 202. The unloading position, on the other hand, is the position in which the disc tray 2 protrudes towards the forward side of the chassis 1, that is the disc tray 2 protrudes out of the slit aperture 75, as shown in FIG. 2. When in the unloading position, the disc tray 2 protrudes towards the front side of the front panel section 70 via the slit aperture 75, as shown in FIG. 1.

The rear side of the disc tray 2 has a cut-out 44 dimensioned to permit the movable frame 37 of the disc drive unit 4 to be passed therethrough. The cut-out 44 is formed so that, when the disc tray 2 is in the loading position, the cut-out 44 is located on the locus of rotational movement of the movable frame 37.

A substantially disc-shaped rotary table 3 is arranged on the disc tray 2. The rotary table 3 is fitted in a columnar-shaped recess 43 formed on the upper surface of the disc tray 2 and is adapted to be rotated about a supporting shaft 50 formed at the center on the bottom of the recess 43 by having a center region of the lower surface thereof supported by the shaft 50.

The rotary table 3 is rotated by a table drive motor 55 mounted on the bottom of the recess 43. That is, the table drive motor 45 rotates a follower pulley 48 rotatable mounted on the disc tray 2 and a driving gear 49 formed integrally with the follower pulley 48 via a driving pulley 46 mounted on a driving shaft and an endless driving belt 47 placed around the driving pulley 46. The lower surface of the rotary table 3 carries a gear which meshes with the table driving gear 49.

The rotary table is formed with plural large-size disc setting recesses 54 and plural small-size disc setting recesses 53. Each large-size disc setting recess 54 is circular-shaped with an inner diameter equal to the diameter of the large-sized disc 201. These large-size disc setting recesses 54 are arranged at equiangular positions on the circumference of a circle having the center of rotation of the rotary table 3 as its center. Each small-size disc setting recess 54 is circular-shaped and has an inner diameter equal to the diameter of the large-sized disc 202.

The rotary table 3 has cut-outs 52 in association with the large size disc setting recesses 54. The cut-outs are formed extending from the center of the large-size disc setting recesses 54 associated therewith up to the outer periphery of the rotary table 3. The cut-outs 2 are arrayed radially and open on the outer periphery of the rotary table 3. The cut-outs 52 are dimensioned to accommodate part of the disc table 40 and the optical pickup unit 41.

A disc detection unit is mounted on the bottom surface of the small-sized disc setting surface 53 for detecting whether or not the large-sized disc 201 or the small-sized disc 202 is set on the large-size disc setting recesses 54 or on the small-size disc setting recesses 53 associated therewith. The disc detection device may be a so-called light sensor made up of a light-emitting device and a light-receiving device. The results of detection by the disc detection device are routed to an associated control circuit.

The rotational angular position of the rotary table 3 on the disc tray 2 is detected by a sensor provided on the disc tray 2. If five sets of the disc setting recesses 54, 53 are provided on the rotary table 3, the rotary table 3 is provided with indices for indicating at which of the five rotational angular positions of 0°, 72° 144° 216° and 288° the rotary table 3 is positioned. It is these indices that are detected by the sensor.

When the disc tray 2 is at the loading position and the movable frame 37 is at the release position, the large-sized disc 201 or the small-sized disc 202 set on the disc setting recesses 53, 54 positioned above the cut-out 44 of the disc tray 2 is held between the arm section 35 and the pickup block 38 of the disc drive unit 4. When the movable frame 37 is rotated at this time up to the chucking position, the disc table 40 intrudes into the cut-out 52 so that the large-sized disc 201 or the small-sized disc 202 is chucked by having its center region clamped between the disc table 40 and the chucking plate 36. The discs 201, 202 thus checked is maintained at a position lifted slightly out of contact with the rotary table 3.

It is noted that, when the disc tray 2 is at the loading position and the movable frame 37 is at the release position, the rotary table 3 is rotated by the drive motor 45.

When the disc tray is at the unloading position, the rotary table 3 is rotated by the table drive motor 45. The rotary table 3 is rotated at this time for sequentially feeding the disc setting recesses 53, 54 which protrudes ahead of the front panel 70 in order to permit the large-sized disc 201 or the small-sized disc 202 to be set on the disc setting recesses 53, 54 or to permit the large-sized disc 201 or the small-sized disc 202 set on the disc setting recesses 53, 54 to be exchanged with new discs.

Figure 6:
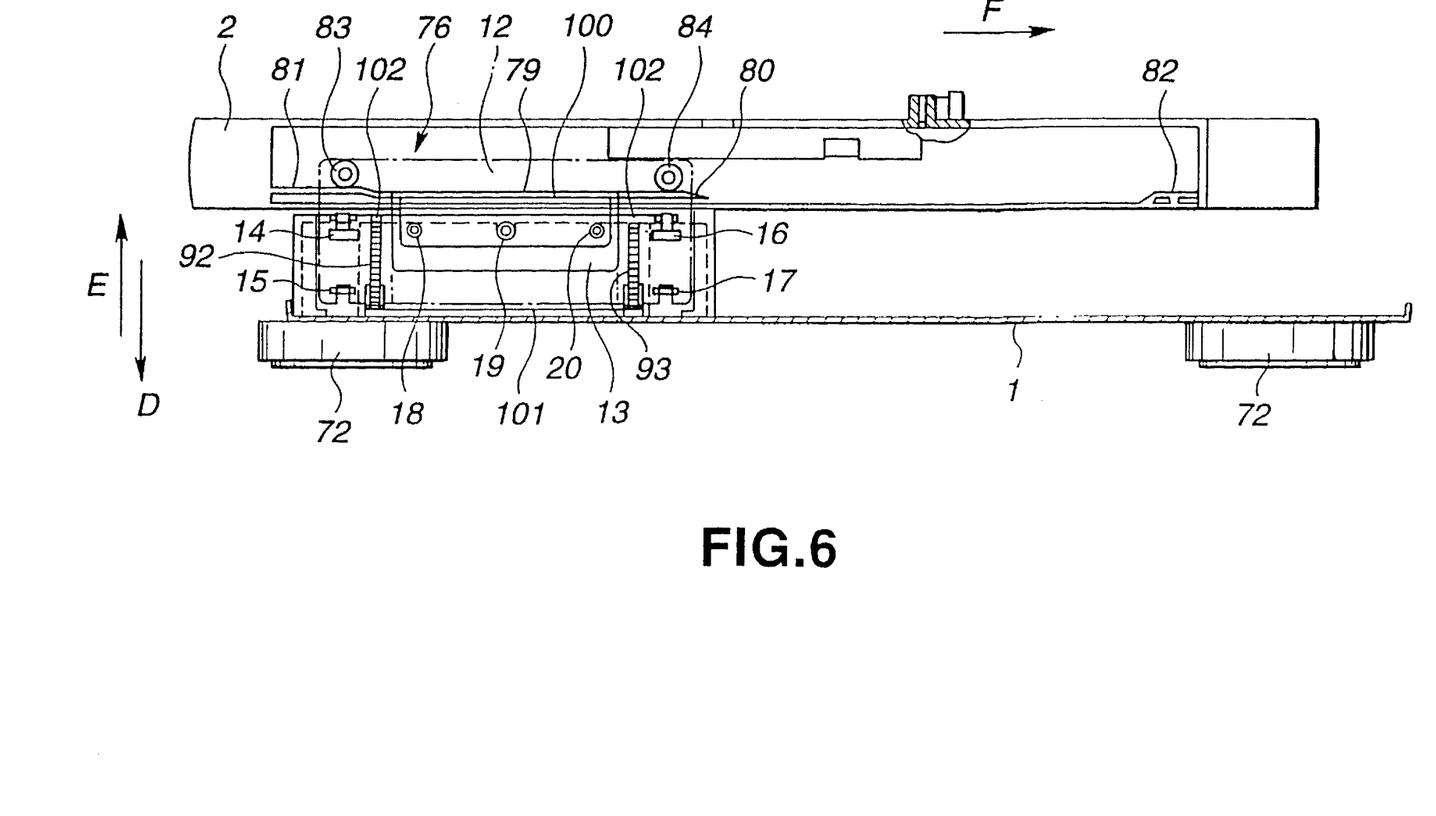
FIG. 6 is a longitudinal sectional view showing the disc recording and/or reproducing apparatus of FIG. 1 in a loading state.

On each lateral side of the disc tray 2 a pair of suppressors 76 are provided for preventing the occurrence of the resonant oscillations of the disc tray. These suppressors are formed as grove-shaped recesses extending in the fore-and-aft direction on each lateral side of the disc tray 2, as shown in FIG. 6. A first cam 81, a second cam 79 and a third cam 82 are formed in the groove-shaped recess. The first cam 81 and the second cam 79 are continuously formed as ribs extending along the lower edge of the groove-shaped recess from the forward side towards the rear side of the disc tray 2. A supporting groove 100 is defined between the rib playing the role of the first and second cams 81, 79 and the lower edge of the groove-shaped recess. The upper edge of the first cam 81 is parallel to and spaced apart a first pre-set distance from the lower edge of the groove-shaped recess. The upper edge of the second cam 79 is parallel to and spaced apart from the lower edge of the groove-shaped recess a second distance smaller than the first pre-set distance. The upper edges of the first and second cams 81, 79 are merged into each other via inclined sections. The rear end of the second cam 79 becomes an inclined section 80 inclined towards the rear. The third cam 82 is formed as a rib formed within the groove-shaped recess for extending along the lower edge of the groove-shaped recess from the rear end towards the forward side of the disc tray 2. The upper edge of the third cam 82 is parallel to and spaced apart by a first pre-set distance from the lower edge of the groove-shaped recess.

Figure 13:
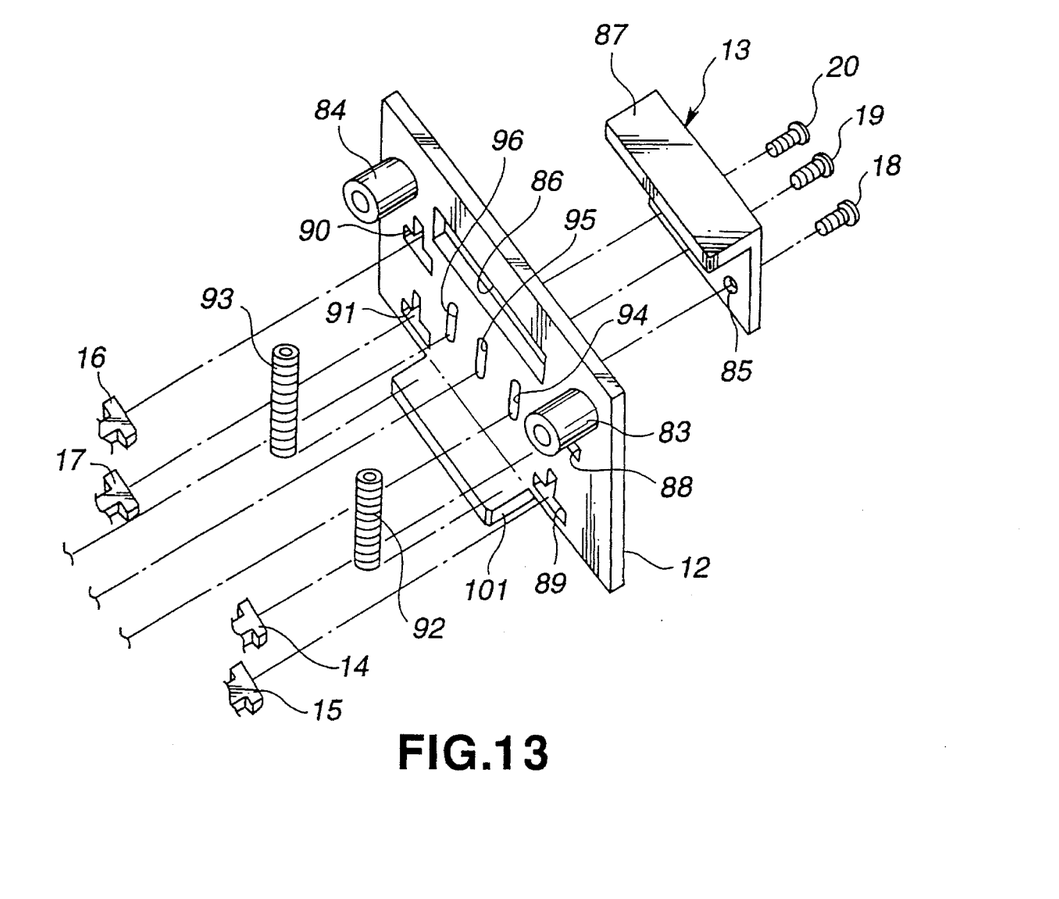
FIG. 13 is an enlarged exploded perspective view showing the structure of the tray fastening mechanism.

On both lateral sides of the chassis 1 are mounted a forward side pair of rollers 83 and a rear side pair of rollers 84 as columnar-shaped rotating members which follow the cams and which constitute the suppression means along with the suppressors 76. These rollers 83, 84 are mounted on the left side and right side supporting plates 12 which act as supporting members. In FIG. 3, only one supporting plate 12 is shown. The supporting plates 12 are mounted on the block 8 and on the supporting block 9 for movement in the vertical direction, that is in a direction towards and away from the chassis 1. That is, the supporting plates 12 are mounted facing each other so as to be perpendicular to the chassis 1 and parallel to the lateral side edge of the chassis 1. Each supporting plate 12 has supporting slits 88, 89, 90 and 91 each having the long-axis direction as its longitudinal direction, as shown in FIG. 13. Each supporting plate 12 is supported by support pawls 14, 15, 16 and 17 protuberantly formed on the outer surfaces of the blocks 8 and 9 by being engaged in these supporting slits 88, 89, 90 and 91. The rollers 83, 84 are mounted on the facing inner lateral sides of the supporting plates 12 in the fore-aft direction. These rollers 83, 84 are rotatably mounted on a pivoting supporting shaft perpendicular to the supporting plate 12 as the center of rotation.

Each supporting plate 12 is biased towards the chassis 1, that is towards the lower side, by compression coil springs 92, 93 as biasing means, as indicated by arrow D in FIGS.

5 to 8. These compression springs 92, 93 are interposed with slight compression between a tongue 101 formed by bending the lower edge of the supporting plate 12 and a flange 102 formed on the upper edge of each block 8 or 9. Each supporting plate 12 is positioned at the initial position by the supporting pawls 14 to 17 abutting on the upper edges of the supporting slits 88 to 91, respectively.

Figure 5:
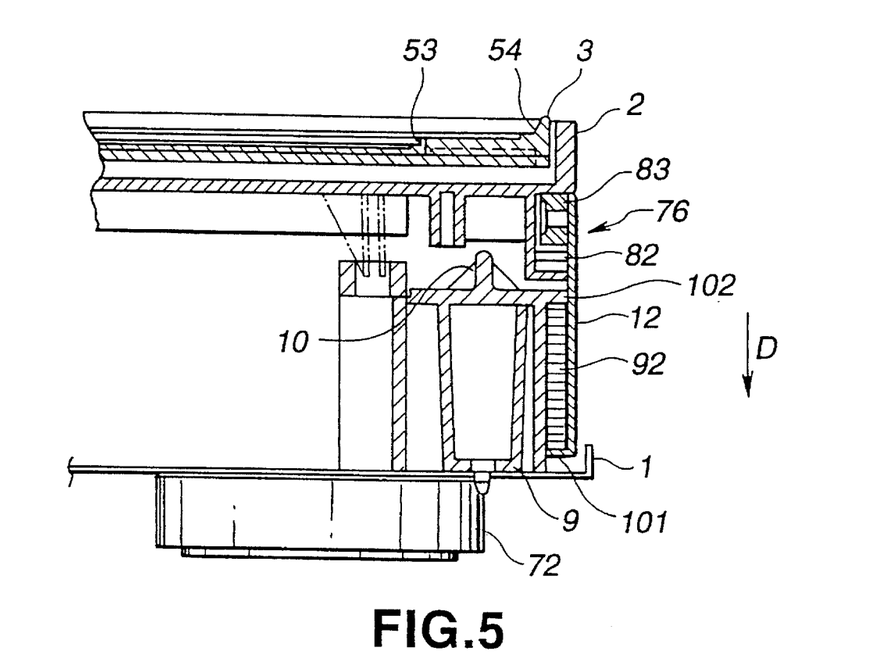
FIG. 5 is an enlarged longitudinal sectional view showing a tray fastening structure in the disc recording and/or reproducing apparatus shown in FIG. 1.
Figure 8:
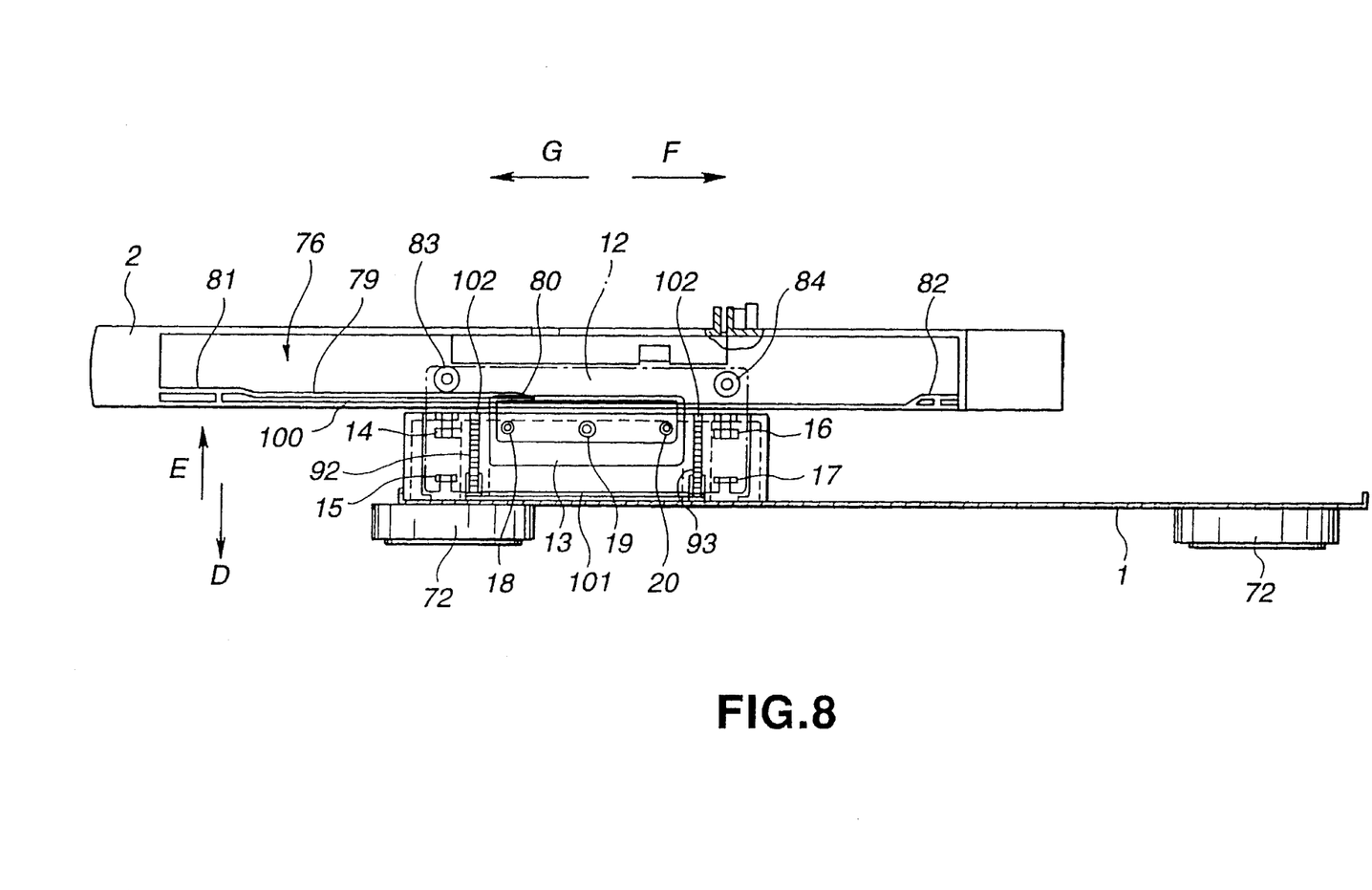
FIG. 8 is a longitudinal sectional view showing the disc recording and/or reproducing apparatus of FIG. 1 in an intermediate state between a loading state and an unloading state.

The rollers 83, 84 of the supporting plates 12 intrude into the groove-shaped recesses which constitute the tray tightening sections 76 from both sides of the disc tray 2, as shown in FIG. 5. When the disc tray 2 is at the loading position, the rollers 83, 84 are thrust upwards, against the bias of the compression coil springs 92, 93, so as to follow the first and the second cams 81, 79, for thrusting and supporting the disc tray 2 downwards, as shown in FIG. 6. When the disc tray 2 is at the unloading position, the rear roller 84 is thrust upwards, against the bias of the compression coil springs 92, 93, so as to follow the third cam 82, for thrusting and supporting the disc tray 2 downwards. When the disc tray 2 is intermediate between the loading position and the unloading position, the rollers 83, 84 are out of contact with the cams 81, 79 and 82, so as to set the supporting plate 12 to its initial position, without thrusting the disc tray 2, as shown in FIG. 8.

Figure 4:
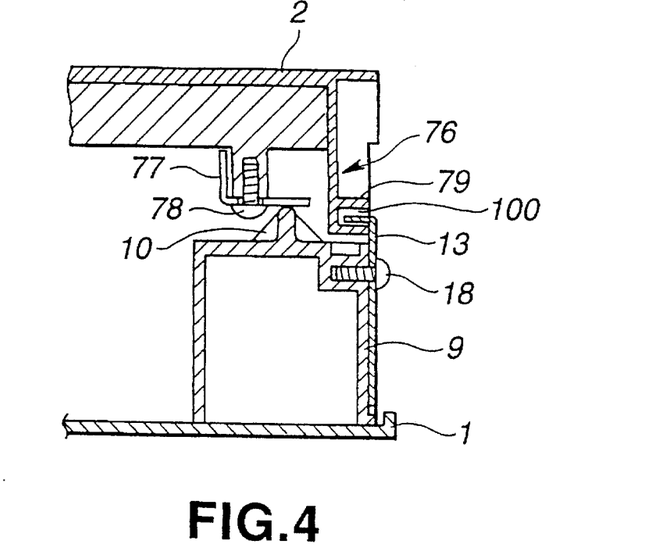
FIG. 4 is an enlarged longitudinal sectional view showing a structure for supporting the disc tray in the disc recording and/or reproducing apparatus shown in FIG. 1.

A tray guide plate 13 is mounted on the supporting block 9, as best shown in FIGS. 4 and 13. The tray guide plate 13 is mounted on the support block 12 in superposition with the supporting plate 12 by plural set screws 18, 19 and 20. The supporting plate 12 has vertically elongated through-slits 94, 95 and 96 into which the set screws 18, 19 and 20 pass. The tray guide plate 13 has its upper end bent towards the inner lateral side to form a guide section 87 which intrudes towards the disc tray 2 via a through-hole 86 formed in the supporting plate 12 so as to intrude into the supporting groove 100 and is positioned in the vicinity of the lower edge of the groove-shaped recess in the suppressor 76. The guide section 87 suppresses movement of the disc tray 2 in an upward direction, that is, in a direction away from the chassis 1.

Figure 10:
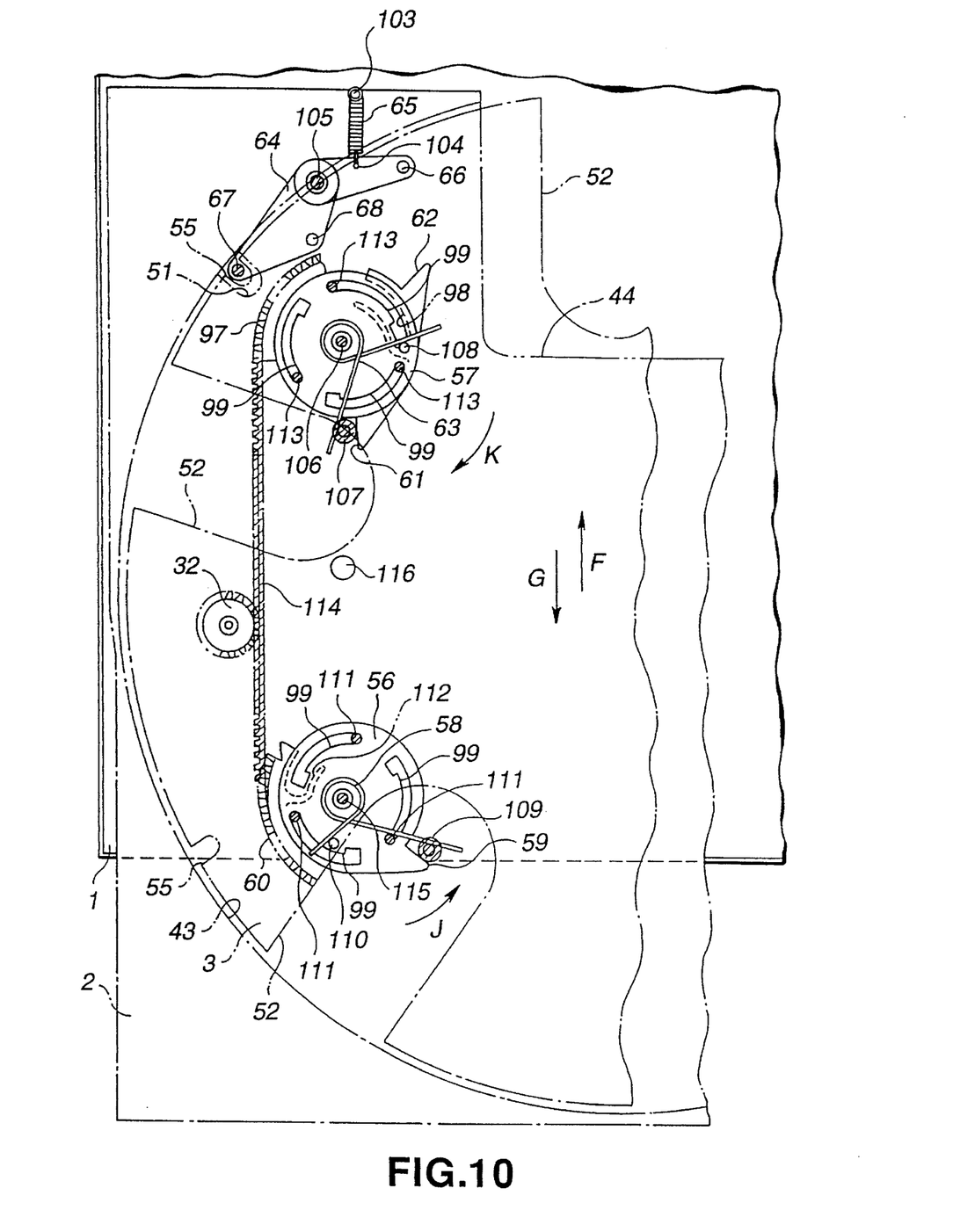
FIG. 10 is an enlarged plan view showing the state of a disc tray and related components of the disc recording and/or reproducing apparatus of FIG. 1 in an intermediate state between a loading state and an unloading state.
Figure 11:
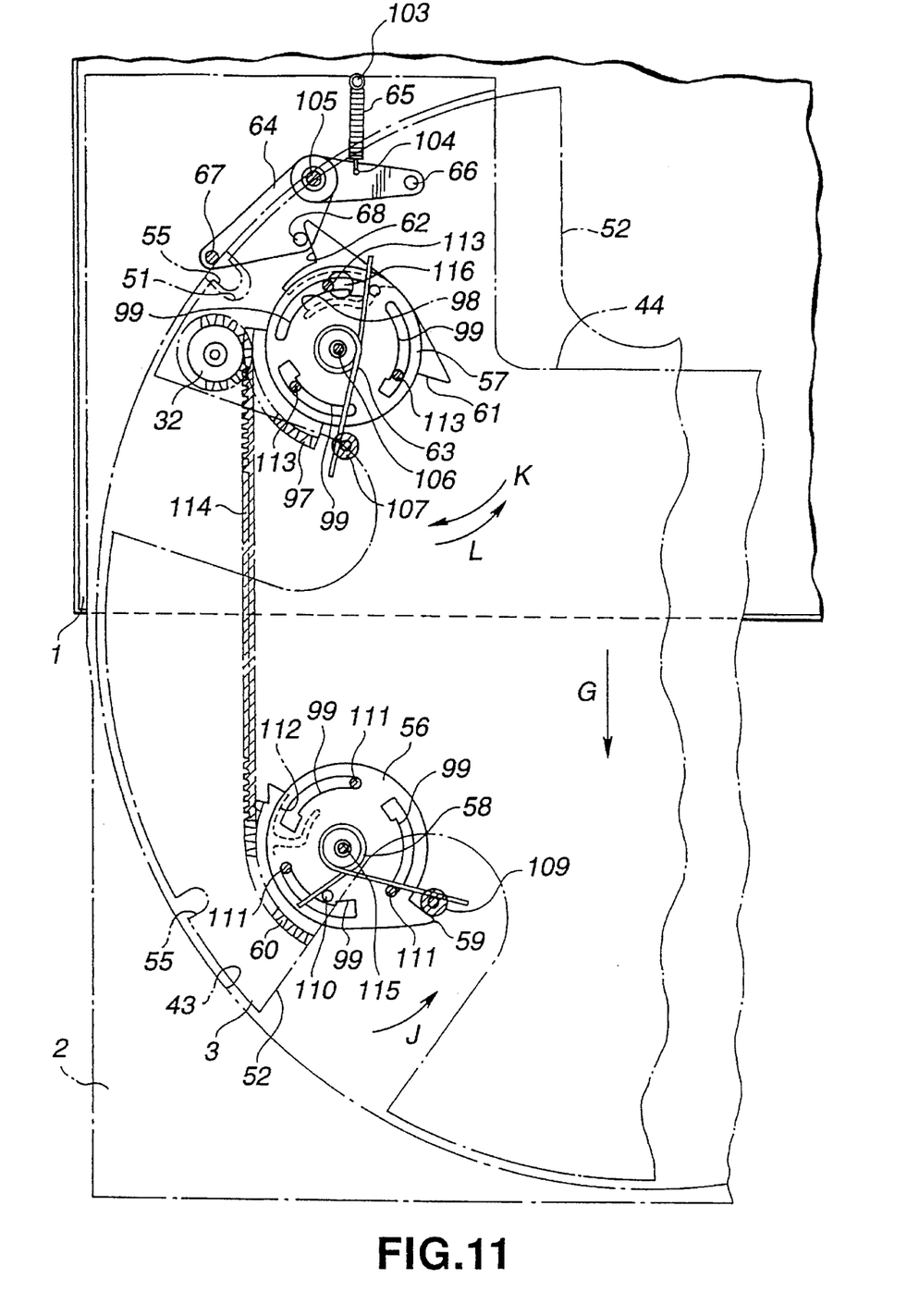
FIG. 11 is an enlarged plan view showing the state of a disc tray and related components of the disc recording and/or reproducing apparatus of FIG. 1 in the unloading state.
Figure 12:
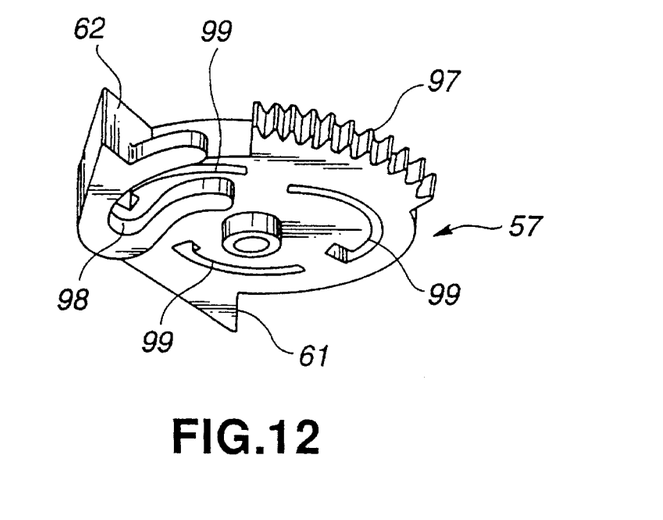
FIG. 12 is an enlarged perspective view showing the shape of an interrupted gear in the disc recording and/or reproducing apparatus.

On the lower surface of the disc tray 2, there are rotatable mounted first and second interrupted gears 56, 57, as tray locking means, as shown in FIG. 3 and FIGS. 9 to 12. These interrupted gears 56 and 57 are substantially disc-shaped and formed on the outer peripheries thereof with gear teeth 60, 97, extending over a pre-set angular range, as shown in FIG. 12. Each of the interrupted gears 56 and 57 has a set of arcuate supporting slits 99, 99, 99. The interrupted gears 56 and 57 are rotatable supported by having depending supporting pins 111, 111, 111, 113, 113, 113 passed through the supporting slits 99, 99, 99.

The first interrupted gear 56 is mounted so that the gear teeth 60 form a continuing portion of the forward side end of a rack gear 114, that is, the first interrupted gear 56 is mounted with a point spaced apart from the forward side end of the rack gear 114 in a direction perpendicular to the rack gear 114 a distance equal to the radius of the first interrupted gear 56 as a center of rotation. In an initial state of the first interrupted gear 56, shown in FIG. 10, the first interrupted gear 56 is rotationally biased by a torsion coil spring 58 having its coil part wound about a support shaft 115 of the first interrupted gear 56 in a direction of forwardly moving the gear part 60 towards the forward side of the disc tray 2, as shown by arrow J in FIG. 10. The torsion coil spring 58 has one of its arms retained by a retention pin 109 formed on the lower surface of the disc tray 2, while having its other arm retained by a retention protrusion 110 formed on the lower surface of the first interrupted gear 56. In this initial position, the first interrupted gear 56 is positioned at an initial rotational position, with a positioning protrusion 59 on its outer periphery abutted against the retention pin 109 (FIG. 10). The gear teeth 60 are extended at this time towards the forward side of the rack gear 114 for forming a continuing portion of the rack gear 114.

The first interrupted gear 56 has a locking groove 112 on its lower surface. The locking groove 112 is formed as an arc having the center of rotation of the first interrupted gear 56 as its center and having its backwardly directed side opened when the first interrupted gear 56 is at the initial rotational position.

When the disc tray is moved to the loading position, with the forward side end of the rack gear 114 being disengaged towards the rear side of the loading gear 32, the first interrupted gear 56 has its gear teeth 60 engaged with the loading gear 32, and is rotated against the bias of the torsion coil spring 58 in a direction shown by arrow I in FIG. 9. The locking groove 112 is engaged at this time by a locking pin 116 formed on the chassis 1 in the vicinity of the loading gear 32. With the locking groove engaged in this manner by the locking pin 116, the disc tray 2 is unable to be moved in the fore-and-aft direction.

If, with the locking groove 112 engaged by the locking pin 116, the loading gear 32 is rotated in the direction of moving the disc tray 2 in the forward direction, the first interrupted gear 56 is rotated by the loading gear 32 and thereby returned to its initial rotational position for disengaging the locking groove 112 from the locking pin 116. The disc tray 2 is moved forwards after the first interrupted gear 56 is returned to the initial rotational position.

The second interrupted gear 57 is mounted so that its gear teeth 97 form a continuing portion of the rear side end of the rack gear 114, that is, the second interrupted gear 57 is mounted with a point spaced apart from the rear side end of the rack gear 114 in a direction perpendicular to the rack gear 114 a distance equal to the radius of the second interrupted gear 57 as a center of rotation. In an initial state of the second interrupted gear 57, shown in FIG. 10, the second interrupted gear 57 is rotationally biased by a torsion coil spring 63 having its coil part wound about a support shaft 106 of the second interrupted gear 57 in a direction of backwardly moving the gear teeth 97 towards the rear side of the disc tray 2, as shown by arrow E in FIG. 10. The torsion coil spring 63 has one of its arms retained by a retention pin 107 formed on the lower surface of the disc tray 2. The torsion coil spring has its other arm retained by a retention protrusion 108 formed on the lower surface of the second interrupted gear 57. In this initial position, the second interrupted gear 57 is positioned at an initial rotational position, with a positioning protrusion 61 on its outer periphery abutted against the retention pin 107. The gear part 60 is extended at this time towards the rear side of the rack gear 114 for forming a continuing portion of the rack gear 114.

The second interrupted gear 57 has a locking groove 98 on its lower surface. The locking groove 98 is formed as an arc having the center of rotation of the second interrupted gear 57 as its center and having its backwardly directed side opened when the second interrupted gear 57 is at the initial rotational position.

When the disc tray is moved to the unloading position, with the rear side end of the rack gear 114 being disengaged towards the forward side of the loading gear 32, the second interrupted gear 57 has its gear part 97 engaged with the loading gear 32, and is rotated against the bias of the torsion coil spring 63 in a direction shown by arrow L in FIG. 11. The locking groove 98 is engaged at this time by the locking pin 116. With the locking groove engaged in this manner by the locking pin 116, the disc tray 2 is unable to be moved in the fore-and-aft direction.

If, with the locking groove 98 engaged by the locking pin 116, the loading gear 32 is rotated in the direction of moving the disc tray 2 towards the rear, the second interrupted gear 57 is rotated by the loading gear 32 and thereby returned to its initial rotational position for disengaging the locking groove 98 from the locking pin 116. The disc tray 2 is moved backwards after the second interrupted gear 57 is returned to the initial rotational position.

The locking pin 116 is mounted on a straight line interconnecting the center of rotation of the interrupted gear 56 and that of the interrupted gear 57.

On the lower surface of the disc tray 2 a table lock lever 64 is pivotally mounted to function as a table lock means. The table lock lever 64 is pivotally supported by a supporting shaft 105 provided on the lower surface of the disc tray 2 and is positioned behind the second interrupted gear 57. The table lock lever 64 has on its forward end a table lock pin 67 which intrudes into and out of a recess 43 in the disc tray 2 via a through-hole 51 formed in the recess 43 as a result of rotation of the table lock lever 64. In the initial state, the table lock lever 64 is positioned by being rotationally biased to intrude the table lock pin 67 into the recess 43 via the through-hole 51 by a tension coil spring 65 mounted between a retention hole 104 formed towards the rear end of the table lock lever and a retention pin 103 provided near the rear end of the disc tray 2, as shown in FIG. 10.

When the table lock lever 64 is positioned at the initial position, the table lock pin 67 engages one of the plural lock recesses 55 formed on the peripheral surface of the rotary table 3 in order to prevent rotation of the rotary table 3. The lock recesses 55 are formed in register with disc setting recesses 54, 53 and formed equiangularly about the peripheral surface of the rotary table 3, with the number of the lock recesses 55 being thus equal to the number of sets of recesses 54 and 53. The rotary table 3, unable to rotate by the operation of the table lock pin 67, is positioned to cause a selected one of the sets of the disc setting recesses 54, 53 and the associated cut-out 52 to be aligned with the cut-out 44 in the disc tray 2.

When the disc tray 2 is at the loading position, the table lock lever 64 is rotated against the bias of the tension coil spring 65 in a direction indicated by arrow H in FIG. 9 by abutment of a first actuating pin 66 near its rear end against an actuating lug 28 formed on the rear side of the chassis for moving the table lock pin 67 out of the recess 44 of the disc tray 2, as shown in FIG. 9. With the table lock pin 67 moved out of the recess 44 of the disc tray 2, the rotary table 3 may be rotated with respect to the disc tray 2.

When the disc tray 2 reaches the unloading position and the second interrupted gear 57 is rotated, the table lock lever 64 has a second actuating pin 68 at its forward end being abutted against an actuating protrusion 62 formed on the outer periphery of the second interrupted gear 57, as shown in FIG. 11. Thus the table lock lever 64 is rotated against the bias of the tension coil spring 65 to move the table lock pin 67 out of the recess 44 of the disc tray 2. The rotary table 3 may now be rotated relative to the disc tray 2.

In the initial state before start of use of the above-described disc recording and/or reproducing apparatus, the disc tray 2 is at the loading position, with no large-sized disc 201 or the small-sized disc 202 set on the rotary table 3, as shown in FIGS. 2, 6 and 9.

Figure 7:
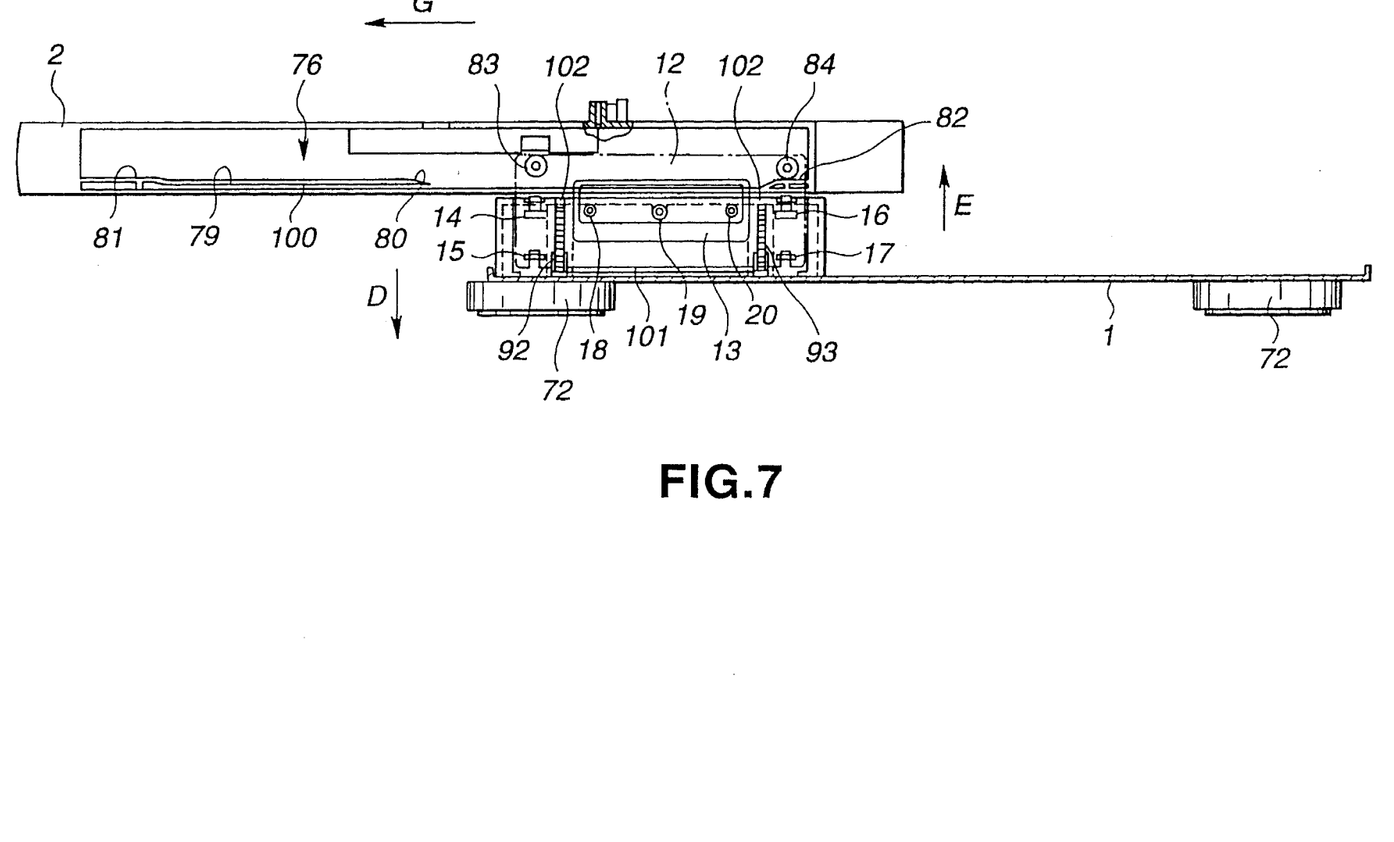
FIG. 7 is a longitudinal sectional view showing the disc recording and/or reproducing apparatus of FIG. 1 in an unloading state.

For setting the large-sized disc 201 or the small-sized disc 202 on the disc recording and/or reproducing apparatus, an actuating member 73 is actuated for moving the disc tray 2 forwardly as shown by arrow G in FIGS. 7 and 11 for shifting the disc tray 2 to the unloading position as shown in FIGS. 3, 7 and 11. During the movement of the disc tray 2 to the unloading position, the rotation of the rotary table 3 is inhibited by the table lock lever 64, as shown in FIG. 10.

When the disc tray 2 is at the unloading position, the forward half portion of the disc tray 2 protrudes beyond the front panel section 70. The disc tray 2 has the third cam 82 thrust and supported by the roll 84 and is thereby disabled to perform oscillatory movements. The rotary table 3 is enabled at this time to be rotated by a table drive motor 45. By rotation of the rotary table 3, the large-sized disc 201 or the small-sized disc 202 may sequentially be set on the disc setting recesses 54, 53. When in the unloading position, the disc tray 2 is locked in the unloading position by the lock groove 98 in the second interrupted gear 57 being engaged by the lock pin 116. The movable frame 37 of the disc drive unit 4 is at the release position.

For recording or reproducing the information signals on or from the disc 201, 202 set on the rotary table 3, the disc tray 2 is moved towards rear as indicated by arrow F in FIGS. 8 and 10 for moving the disc tray 2 to the loading position as shown in FIGS. 2, 6 and 9. During the movement of the disc tray 2, rotation of the rotary table 3 is inhibited by the table lock lever 64, as shown in FIG. 10. At this time, there is no risk of the rotary table 3 being rotated by an external force.

When in the loading position, the disc tray 2 has the first and the second cams 81, 79 thrust and supported by the rolls 83, 84 to prevent oscillatory movements. The rotary table 3 is enabled to rotate as the table lock lever 64 is rotated by the actuating lug 28. The rotary table 3 is free to rotate at this time by the actuating member 73 for selecting one of the recording discs 201, 202 as set on the rotary table 3 and transporting the selected disc to a position to register with the disc drive unit 4. The movable frame 37 then is moved to the chucking position for chucking the selected disc 201 or 202 on the disc table 40.

The discs 201, 202, thus chucked on the disc table 40, is run in rotation at, for example, a constant linear velocity (CLV) by a spindle motor for reading or recording information signals by the optical pickup device 41. Should oscillatory movements be produced during rotation of the disc 201 or 202, the disc tray 2 is not driven into resonant oscillations because the disc tray 2 is prevented from minute movements or oscillations by the rolls 83, 84.

Also, with the present disc recording and/or reproducing apparatus, the disc tray 2 may be moved to its unloading position when the first discs 201 or 202, for example, are loaded on the disc table 40. At this time, the large-sized disc 201 or the small-sized disc 202 may be set on the second to fifth recesses 54, 53 or the discs set thereon may be exchanged with new ones. These setting and exchanging operations may be performed while rotating the rotary table 3.

If, with the present disc recording and/or reproducing apparatus, the disc tray 2 is moved to the unloading position when the first discs 201, 202 have been loaded on the disc table 40, the disc tray 2 may be returned to the loading position on the condition that there are no other discs 201, 202 set on the first disc-setting recesses 54, 53 in which the first discs 201, 202 were set, and that the rotational angular position of the rotary table 3 is such that the first disc setting recesses 54, 53 are at a rear position facing the disc drive unit 4. The possible presence of the discs 201, 202 on the first disc setting recesses 54, 53 or the rotational angular position of the rotary table 3 may be discriminated by the control circuit based upon the results of detection by the disc detection device and the sensor designed to detect the rotational angular position of the rotary table 3.

If, with the present disc recording and/or reproducing apparatus, the power supply is interrupted when a disc 201 or 202 is loaded on the disc table 40 and the disc tray 2 is moved towards the unloading position, there is the risk of the rotary table 3 being rotated by an external force. However, the disc tray 2 is not moved by an external force. Consequently, there is no risk of the disc tray 2 being moved backwards whilst the other discs 201, 202 remain set on the disc setting recesses 54, 53 disposed towards the rear for facing the disc drive unit 4. When the power supply is re-started, the control circuit is again in operation in order to check for the conditions that there are no other discs 201, 202 set on the first disc setting recesses 54, 53 on which the discs 201, 202 loaded on the disc drive unit 4 were set and that the rotational angular position of the rotary table 3 is such that the first disc setting recesses 54, 53 are disposed at the rear position. Consequently, the disc tray 2 is not moved backwards unless these conditions are met.

The discs 201, 202 loaded on the disc table 40 are set on the disc setting recesses 54, 53 on which these discs were set as a result of the movable frame 37 being moved to the release position when the disc tray 2 is at the loading position. Under this condition, selection of the discs may be made by rotating the rotary table 3. That is, by rotating the rotary table 3 for moving the movable frame 37 to its chucking position, other discs 201, 202 may be loaded on the disc table 40. The disc tray 2 may be moved at this time to the unloading position for taking out the discs 202, 201 out of the disc recording and/or reproducing apparatus.

What is claimed is:

1. A disc recording/reproducing apparatus having a main body and comprising:

recording/reproducing means for recording/reproducing information signals on or from a disc, said recording/reproducing means being mounted in said main body;

a transport tray mounted in said main body for movement between a loading position proximate said recording/reproducing means and an unloading position at least partially outside of said main body;

drive means for moving said transport tray between the loading position and the unloading position;

a rotary table rotatably mounted on said transport tray, said rotary table having plural disc-setting recesses extending radially from the center thereof, means for rotating said rotary table relative to said transport tray for selectively positioning one of said disc setting recesses at a position proximate said recording/reproducing means, a first lock means on said transport tray for preventing rotation of said rotary table with respect to said transport tray when said transport tray is not at said loading or unloading positions; and a second lock means operated by said drive means for preventing movement of said transport tray when the transport tray reaches said unloading position, said apparatus further comprising an oscillation suppression means for inhibiting oscillating movement of said transport tray at said loading position or at said unloading position, wherein said oscillation suppression means comprises a cam associated with said transport tray, a cam follower member mounted in the main body in rolling contact with said cam and means for biasing said cam follower member towards said cam.

2. A disc recording/reproducing apparatus according to claim 1, wherein said first lock means includes a lock member pivotally mounted on said transport tray for engaging said rotary table, and an actuating member for disengaging said lock member from said rotary table when the transport tray is at said loading position, said lock member being disengaged from said rotary table when the transport tray is at said unloading position.

3. A disc recording/reproducing apparatus having a main body and comprising:

recording/reproducing means for recording/reproducing information signals on or from a disc, said recording/reproducing means being mounted in said main body;

a transport tray mounted in said main body for movement between a loading position proximate said recording/reproducing means and an unloading position at least partially outside of said main body;

drive means for moving said transport tray between the loading position and the unloading position;

a rotary table rotatably mounted on said transport tray, said rotary table having plural disc-setting recesses extending radially from the center thereof, means for rotating said rotary table relative to said transport tray for selectively positioning one of said disc setting recesses at a position proximate said recording/reproducing means;

a first lock means on said transport tray for preventing rotation of said rotary table with respect to said transport tray when said transport tray is not at said loading or unloading positions; and a second lock means operated by said drive means for preventing movement of said transport tray when the transport tray reaches said unloading position;

wherein a lock part is provided in the main body of the apparatus and wherein said second lock means includes a first rotary member which engages with said lock part at said loading position to prevent movement of the transport tray, and a second rotary member which engages with said lock part at said unloading position to prevent movement of the transport tray, said first and second rotary members being associated with said transport tray, said first rotary member and the second rotary member being driven by said drive means when the transport tray reaches said loading position or said unloading position, wherein said lock part is mounted about on a straight line interconnecting the center of rotation of the first and second rotary members.

4. A disc recording/reproducing apparatus according to claim 3, wherein said drive means includes a drive gear for engaging a rack associated with said transport tray for moving said transport tray, and wherein said first rotary member and the second rotary member include gears for meshing with said drive gear.

5. A disc recording/reproducing apparatus according to claim 3, wherein said first rotary member and the second rotary member are positioned on said transport tray along a locus of movement of said transport tray.

6. A disc recording/reproducing apparatus according to claim 3, wherein said first lock means includes a lock member pivotally mounted on said transport tray for engaging said rotary table, and an actuating member for disengaging said lock member from said rotary table when the transport tray is at said loading position, said lock member being disengaged from said rotary table when the transport tray is at said unloading position.

7. A disc recording/reproducing apparatus according to claim 3, said apparatus further comprising an oscillation suppression means for inhibiting oscillating movement of said transport tray at said loading position or at said unloading position.

8. A disc recording reproducing apparatus according to claim 7, wherein said oscillation suppression means comprises a cam associated with said transport tray, a cam follower member mounted in the main body in rolling contact with said cam and means for biasing said cam follower member towards said cam.

\* \* \* \* \*